Dec. 23, 1958    H. W. SIMPSON    2,865,230
FOUR SPEED TRANSMISSION
Filed Aug. 20, 1956    2 Sheets-Sheet 1
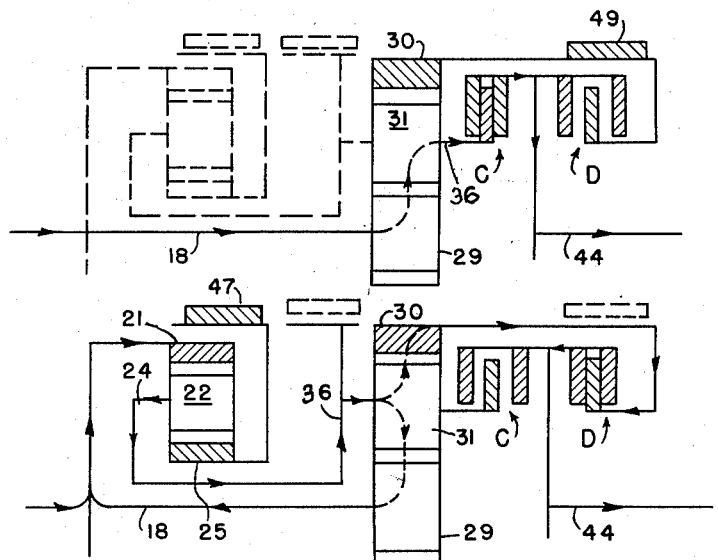
FIG. 1
FIG. 2
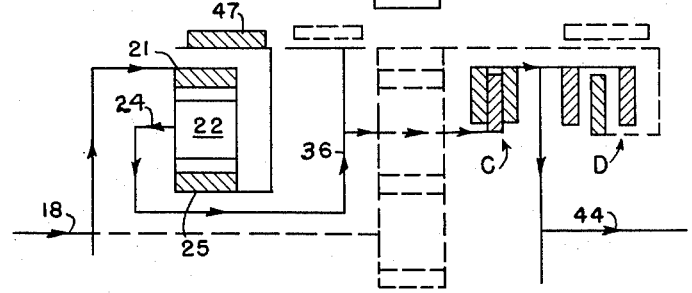
FIG. 3
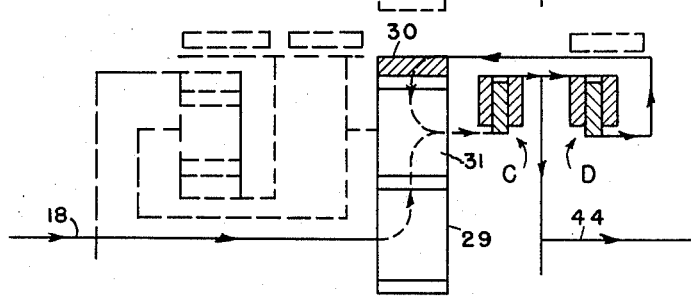
FIG. 4
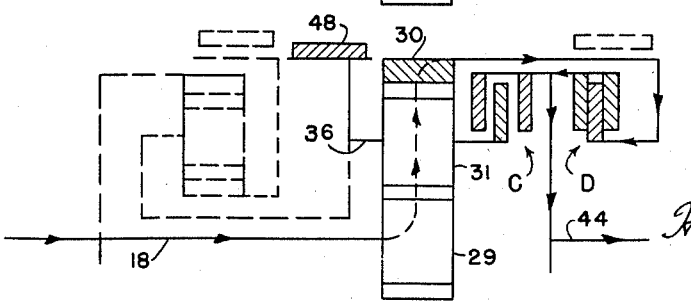
FIG. 5
INVENTOR.
Howard W. Simpson

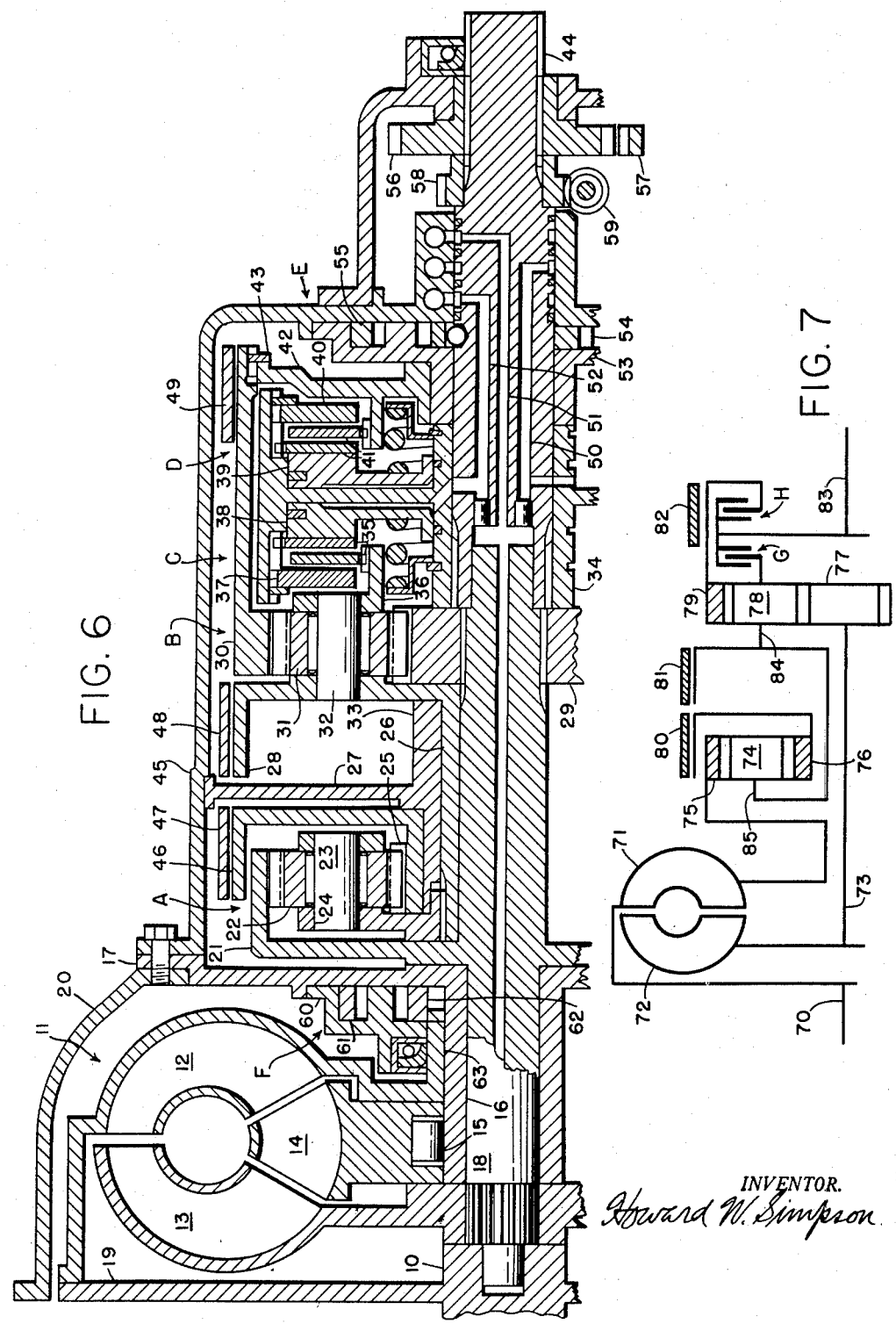

United States Patent Office 2,865,230
Patented Dec. 23, 1958

2,865,230

FOUR SPEED TRANSMISSION

Howard W. Simpson, Dearborn, Mich.

Application August 20, 1956, Serial No. 605,020

4 Claims. (Cl. 74—759)

This invention refers to a planetary transmission having four speeds forward and one in reverse, for a self-propelled vehicle. In particular it is a novel combination of a hydrodynamic coupling, driving, driven and supporting members, planetary gearing, friction clutches of the plate type, reaction members and brakes for holding them, and hydraulic control elements combined to operate the mechanism in various forward speeds and in reverse.

The gearing consists of two simple planetary gear sets each with sun, planet and ring gears all in one radial plane and with the planet gears meshing with both the sun and ring gears.

This type of planetary gearing is very efficient, quiet and has balanced tooth separating forces which prevent movement of the gears out of their original position of mesh due to wear or looseness in the teeth or bearings.

An object of this invention is to reduce friction due to the drag of clutch plates running in oil when the clutches are released. This is done by locating the clutches at the output instead of at the input end of the transmissions. As a result the clutch plate differential speeds are very low in all speeds.

Another object is to obtain an adequate range of gear ratios with small gear sets which can be identical, as to number of teeth, to reduce the cost. For instance, if both the ring gears in the embodiments shown have the same number of teeth and both sun gears have half as many teeth, the gear ratios in low, 2nd, 3rd and 4th speed are 3.0, 2.0, 1.5 and 1.0 to 1 respectively, and the reverse ratio is 2.0 to 1. The two gear sets need not be alike as to number of teeth, but each sun gear must have half as many teeth as its corresponding ring gear, to obtain the above ratios.

Another object is to combine a fluid coupling with the transmission in such a way that the drive from the source of power by-passes the fluid coupling, in one speed, to eliminate fluid slip.

Another object is to provide stationary structure for supporting the three brake bands to avoid friction on rotating members.

Another object is to provide a transmission in which the gears rotate at moderate speeds both when idling and working.

Another object is to reduce the cost of the two clutches by arranging them in back to back relationship in a single clutch housing located at the rear of the unit to reduce cost and for easy access to hydraulic pressure without the use of multiple glands.

These and other objects will become apparent as the following drawings are viewed with respect to the accompanying specifications.

Figs. 1 to 5 are diagrammatic partial elevations for 1st, 2nd, 3rd, 4th and reverse speeds respectively in which the working parts are shown in full lines and in section and the non-working parts are in dotted lines. The torque paths are shown by arrows.

Fig. 6 is a simplified partial elevation in section with a fluid torque converter in combination.

Fig. 7 is a diagrammatic partial elevation in section with a fluid coupling in combination.

Figs. 6 and 7 are shown in neutral with the brakes and clutches released and the drawings omit minor parts not needed to clearly define the essential structure. Likewise the clutches have only one driving plate although several could be used.

In Fig. 6 engine shaft 10 has flange 19 attached to pump 12 of converter 11 in bell housing 20. Turbine 13 is splined to input shaft 18 and stator 14 rotates freely on sleeve 16 of plate 17 but is prevented from turning backward by one-way clutch 15.

Gear set A consists of ring gear 21 which is integral with input shaft 18, sun gear 25 which is free to turn on the hub of plate 27 and which is integral with brake drum 46, and planet gears, one of which, 22, is shown mounted on rollers on pin 23 which is fixed in carrier 24.

Gear set B comprises sun gear 29 splined to input shaft 18, ring gear 30 splined to clutch drum 42, and planets, one of which, 31, is shown mounted on rollers on pin 32 fixed in carrier 36. Carrier 36 has integral brake drum 28 and is splined to carrier 24.

Hub 26 of carrier 36 is journaled in hub 33 of plate 27 which is fixed in housing 45, and is also free to turn on shaft 18. Clutch drum 42 is retained by snap ring 43.

Clutches C and D have common housing 34 which is splined to output shaft 44 which is journaled in pump housing 53 attached to housing 45.

Clutch plates 35 connect carrier 36 to output shaft 44 when oil under pressure enters passage 52 and forces piston 38 to compress clutch plates 35 against pressure plate 37 which is fixed to housing 34. Clutch plates 41 connect ring gear 30 to output shaft 44 when oil under pressure enters passage 50 and moves piston 39 to press clutch plates 41 against pressure plate 40 attached to clutch housing 34. Oil for lubrication and to supply the converter enters through passage 51.

Pump E has gear 54 driven by output shaft 44 and meshes with gear 55.

Pump F has gear 62 driven by sleeve 63 and meshes with gear 61 in housing 60.

Brake bands 47, 48 and 49 are adapted to hold sun gear 25, carrier 36 and ring gear 30 respectively against rotation.

Gears 58 and 59 are for governor and speedometer drive. Parking gear 56 can be engaged by detent 57 to hold output shaft 44 stationary with housing 45.

In Fig. 7 engine shaft 70 drives fluid coupling pump 71 which is connected to ring gear 75. Turbine 72 and shaft 73 drive sun gear 77. Planet gears 74 mesh with ring gear 75 and sun gear 76 which can be held by brake band 80. Interconnected carriers 84 and 85 can be held by brake band 81 or clutched to output shaft 83 by clutch G. Planet gears 78 mesh with sun gear 77 and ring gear 79 which can be clutched to output shaft 83 by clutch H. Brake band 82 is adapted to hold ring gear 79.

In Fig. 1, low gear, input shaft 18 drives sun gear 29. Ring gear 30 being held by brake band 49 causes planet gears 31 to rotate carrier 36 as slow speed and clutch C connects it to output shaft 44.

In Fig. 2, 2nd gear, the gears are coupled in opposed differential relationship by engaging brake band 47 and clutch D. Ring gear 21 is the input gear and drives carrier 24 forward at reduced speed but since carriers 24 and 36 are connected, ring gear 30 would rotate faster than carrier 36 if sun gear 29 were stationary. But since sun gear 29 is rotating at input speed it reduces the R. P. M. of ring gear 30 so that it is less than that of carrier 36 and clutch D transmits this reduced speed to output shaft 44.

In Fig. 3 ring gear 21 rotates carrier 24 at the same reduced speed as in Fig. 2 but since clutch C is now engaged and clutch D released carrier 24 is connected to the output shaft without its speed and torque being modified by passing through additional gearing. Brake band 47 holds sun gear 25 in both Figs. 2 and 3.

Fig. 4 shows direct drive with the gears locked up by both clutches C and D being engaged.

In Fig. 5, reverse speed, carrier 36 is held by brake band 48 which permits sun gear 29 to turn ring gear 30 and output shaft 44 backward at reduced speed since clutch D is engaged.

In Fig. 7, no torque is transmitted to ring gear 75 in 1st, 4th and reverse speeds, but in 3rd speed the torque of engine shaft 70 is applied directly to ring gear 75 to eliminate fluid slip, thus improving fuel economy.

In second gear, engine shaft torque is also applied to ring gear 75 but since this urges sun gear 77, shaft 73, and turbine 72 to overrun fluid coupling pump 71, fluid slippage occurs to about the same extent as in Fig. 6 when in 2nd speed. This provides the desired smooth engagement of the comparatively large reduction ratio of 2nd speed.

The combination shown in Fig. 7 is well adapted for use in a truck which is driven much of the time in 3rd speed because in this speed the fluid coupling is bypassed. In such a vehicle, 4th speed is then used to reduce engine speed under light loads or at high road speeds.

I claim:

1. In a variable speed power transmission, a housing, axially aligned input and output members, first and second axially aligned planetary gear sets, each set comprising a sun gear, a ring gear and a rotatable carrier supporting a plurality of planet gears, each of which meshes with both the sun gear and ring gear of its own gear set, means connecting the input member to a member of each gear set, a clutch connecting the carrier of each set to the output member, a clutch for connecting the ring gear of the second gear set to the output member, a brake for holding a member of the first gear set stationary, a brake for holding a member of the second gear set stationary and another brake for holding another member of the second gear set stationary, said clutches and brakes being selectively engageable for obtaining a plurality of forward gear ratios and a reverse reduction ratio between the said input and output members.

2. In a variable speed power transmission, a housing, axially aligned input and output members, first and second axially aligned planetary gear sets, each set comprising rotatable sun, ring and carrier members, the ring gear of the first gear set and sun gear of the second gear set being connected to the input member, a clutch for coupling the carrier of each set to the output member, a clutch for coupling the ring gear of the second set to the output member, a brake for holding the sun gear of the first set, a brake for holding the carrier of the second set, and a brake for holding the ring gear of the second set, said clutches and brakes being selectively engageable for obtaining four forward speed ratios and one reverse reduction ratio between the input and output shafts.

3. In a power transmission, input and output members, first and second planetary gear sets, each set comprising a single sun gear, a single ring gear, and a carrier having planet gears each meshing with the sun and ring gears, the carriers being connected together, the ring gear of the first gear set and the sun gear of the second set being connected to the input member, a first clutch for connecting the ring gear of the second set to the output member, and a first brake for holding the sun gear of the first set, a second brake for holding the ring gear of the second gear set and a second clutch for coupling said interconnected carriers to the output shaft, said clutches and brakes being selectively engageable to obtain a plurality of driving ratios between the input and output members.

4. In a power transmission, input and output members, first and second planetary gear sets, each set comprising a single sun gear, a single ring gear, and a carrier having planet gears each meshing with the sun and ring gears, the carriers being connected together, the ring gear of the first gear set and the sun gear of the second set being connected to the input member, a first clutch for connecting the ring gear of the second set to the output member, and a brake for holding the sun gear of the first set, a second clutch for coupling said interconnected carriers to the output member, said clutches and the brake being selectively engageable to obtain a plurality of driving ratios between the input and output members.

References Cited in the file of this patent

UNITED STATES PATENTS

| | | |
|---|---|---|
| 2,176,138 | Kelley | Oct. 17, 1939 |
| 2,324,733 | Smirl | July 20, 1943 |
| 2,546,378 | Winther | Mar. 27, 1951 |
| 2,620,685 | Smirl | Dec. 9, 1952 |
| 2,631,476 | Ravigneaux | Mar. 17, 1953 |

FOREIGN PATENTS

| | | |
|---|---|---|
| 67,646 | Austria | Jan. 25, 1915 |